Jan. 15, 1952   F. AAGAARD   2,582,917
THROTTLING DEVICE
Filed April 8, 1947   2 SHEETS—SHEET 1

INVENTOR
FRIDTJOF AAGAARD,
BY
Robert Ames Norton
ATTORNEY

INVENTOR
FRIDTJOF AAGAARD,
ATTORNEY

Patented Jan. 15, 1952

2,582,917

UNITED STATES PATENT OFFICE 2,582,917

THROTTLING DEVICE

Fridtjof Aagaard, Rahway, N. J., assignor to American Cyanamid Company, New York, N. Y., a corporation of Maine Application April 8, 1947, Serial No. 740,061

4 Claims. (Cl. 251—5)

This invention relates to a control valve for varying the flow of fluid through a conduit.

There are numerous instances where it is necessary to control the rate of a continuous flow of fluid through a conduit. In many cases this is effected manually and in other cases automatically, such as electro-pneumatic controls. With ordinary non-corrosive, clean fluids the control valve problem is not serious and any ordinary type of throttling valve may be used. The problem, however, becomes serious where the fluid is corrosive and where it is not clean but may contain suspended solids. In such cases a serious problem is presented when the flow has to be controlled to a small volume. Most commonly the problem arises with the control of flow of liquids, therefore, the remainder of the specification will deal with liquid flow control devices.

The corrosive effect necessitates the use of corrosion resistant valve material which often has unsuitable physical properties, such as hard rubber valves and the like and which usually is much more expensive. The problem of suspended solids with small flows is even more serious because when a small passageway is provided by the valve, which is necessary when a small flow is desired, there is a serious tendency to clogging when large particles are present in the liquid. A similar problem is encountered with small flows when gas bubbles are present or with liquids containing gummy substances.

It is a comparatively simple problem in the laboratory to handle corrosive liquids. A corrosion resistant, flexible tubing, such as rubber or plastic, may be controlled by a pinch cock. This works well with corrosive material, but presents an even more serious clogging problem with small flows if there is present any considerable quantity of suspended solids in the liquid. Close supervision and manual control makes it possible to operate but when automatic control is used, particularly when the valve or throttling device is in an inaccessible position, clogging is a very serious matter and may cause damaging interruptions.

The present invention overcomes all of the disadvantages of the prior devices. Essentially it consists of a helical coil of flexible corrosion resistant tubing around a solid mandril, preferably positioned between two plates. Movement of one of the plates compresses each turn of tubing between the plates and the mandril. A plurality of constrictions result and if a sufficient number of turns of tubing is used no single constriction is small enough to present a clogging problem and the large number of constrictions in series will introduce sufficient throttling effect so that a small and accurately controlled flow may be maintained.

The present invention solves completely the clogging problem even for relatively small flows and it is also an excellent solution for the corrosion problem because any kind of flexible tubing may be employed and a suitable corrosion resistant material may be chosen because there is no problem of other requirements of mechanical strength which arises when corrosion resistant valves are employed. The tubing is constricted only a little at each point which increases its life because it is not flexed at so sharp an angle as would be necessary if a single constriction were relied on. The life of the tubing is greatly lengthened and the reliability increased which is of great importance in the case of throttling devices or valves which are used in accessible locations. Another advantage lies in the fact the only part of the mechanism which is subject to wear or to contact with corrosive liquids can be readily replaced and the cost of the small amount of flexible tubing is negligible.

While the present invention is broadly concerned with throttling devices in which a helix of flexible tubing on a mandril is compressed between one or more plates regardless of the mechanical structure employed I prefer to use devices in which the moveable plate or plates slide in guides so that the plates are parallel to the axis of the mandril and all turns of the helix of the flexible tubing are equally compressed. This prevents excessive constriction at one point and permits minimum flow with maximum reliability against clogging. Also the control is more smooth and more uniform if the plates remain parallel.

The reference to plates should not be considered as limiting the invention to plates with flat sides although it is an advantage of the present invention that very simple constrictions using flat plates in conventional frameworks may be employed. Where it is desired to effect a maximum throttling with a minimum length of helix the plates may be curved so that a larger area of each turn of the helical tubing is constricted. It is purely a matter of economics and mechanical convenience whether flat plates or curved plates are used because, of course, the same degree of control can always be obtained with flat plates if the number of turns of the helix is sufficiently great. However, in certain cases where maximum compactness is an important factor curved plates become desirable and are included in the scope of the present invention.

While a very accurate and reliable control is obtained by means of the present invention, regardless of whether the valve or throttling device is actuated manually or automatically, the greatest advantages of the present invention are obtained when the throttling device is used in connection with automatic controls, thus, for example, when fluid actuated automatic control, such as compressed air, is employed (one of the most effective controlling means), comparatively large diaphragms become necessary when all of the throttling is to be effected by a conventional valve with exceptionally close clearances, which is standard procedure at the present time. This greatly increases the cost of the throttling device and often times results in a serious hunting problem. Control by means of the present invention requires but little force because none of the multiple constrictions of the tube helix are very great, friction is practically negligible, and response of the valve is extremely rapid. It is thus possible to use lighter and faster responding control devices because of the small volume of control air required. For example, a flexible walled, closed end tube, hereinafter referred to as a flexible tube, may be used between the moveable plate and an additional stationary plate or frame of the throttling device, the open end of the tube being connected to the compressed air supply from the controller. Less power is necessary and in case of replacement such a tube is relatively very cheap. For this reason in the more specific description of the present invention below, throttling devices are described which are suitable for use with automatic controls.

While the throttling device of the present invention presents less of a hunting problem than is encountered with large diaphragms which have hitherto been used in automatically controlled valves, nevertheless, there is still some tendency to hunt when control actuation is not very certain. In such cases a damping or equalizing effect is obtained by connecting a flexible tube between the plates to the liquid flow ahead of the throttling valve. Certain fluctuations in flow will, therefore, tend to open the valve to smooth out the fluctuations and, therefore, the automatic control becomes more steady.

The simple throttling valve of the present invention operates satisfactorily where there are not too great changes in pressure on the liquid to be throttled. In some cases sharp fluctuations in liquid pressure are encountered with certain pumps and in such cases it is desirable to use a somewhat more elaborate device which will compensate, at least partially, for pressure fluctuations because, of course, with a constant constriction flow will vary with varying pressures. It is an advantage of the present invention that compensation for pressure fluctuation may be provided with ease. It is only necessary to connect a closed end flexible tube to the liquid stream ahead of the throttle valve, the flexible tube being positioned beside the main pneumatic tube from the air controller. Pressure variations will, therefore, also move the moveable plate or plates and vary the amount of constriction of the helix. Such compensated throttling valves are included in more specific aspects of the present invention.

Changes in pressure on the down-stream side of the valve may also affect the flow and if sudden will throw a considerable load on the controller. However, the effect of a sudden down-stream pressure is felt first by the last coil of the helix and the effect is self compensating as far as flow through the valve is concerned. Thus, for example, if the down-stream back pressure suddenly increases it increases the pressure in the helix which tends to move the plate to reduce constriction. In other words, the flexible tubing in the helix will tend to damp out to some extent the effect of sudden downstream fluctuations on flow through the valve, therefore, compensation for these effects is not as serious a problem as in the case of fluctuations up-stream from the valve because the latter do not have any self-compensating effect as far as flow is concerned. For this reason it is rarely necessary to provide for compensation of down-stream pressure fluctuations. In some instances, however, where a particularly delicate control is desirable a flexible tube can be connected to the fluid flowing down-stream from the valve. However, this tube must bear against a portion of the valve framework and be positioned so that when it expands it tends to move the plate toward the helix and reduce the constriction. Compensation for down-stream fluctuations is so rarely needed that this refinement is rarely needed, but in the exceptional cases where such compensation is encountered the invention includes valves with down-stream, as well as up-stream, compensation.

The invention will be described in greater detail in conjunction with the drawings, which illustrate compensated and uncompensated automatically air controlled valves, and in which.

Figure 1:
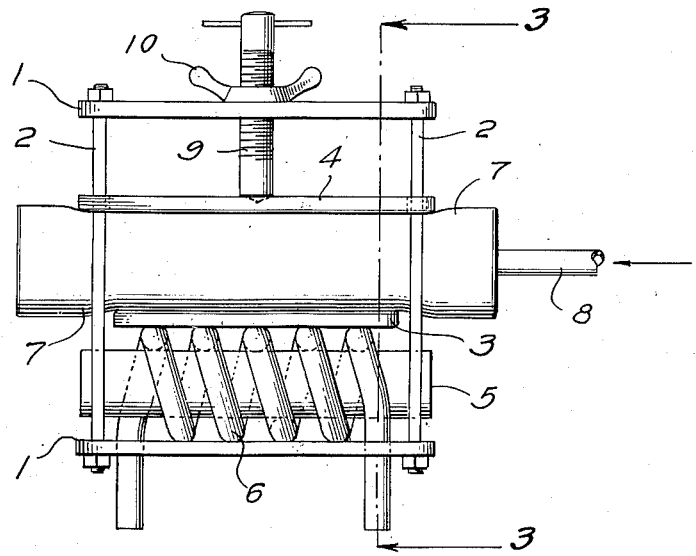
Fig. 1 is a side elevation of an uncompensated throttle valve.
Figure 2:
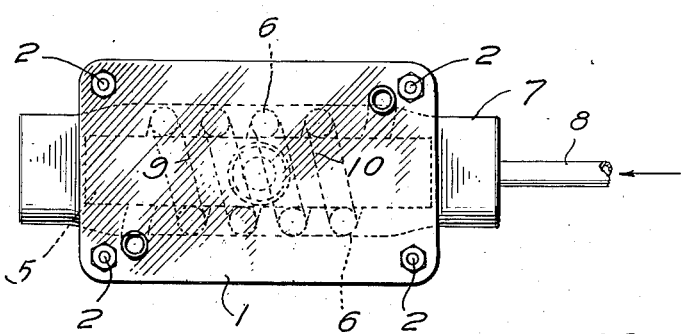
Fig. 2 is a bottom view of the valve shown in Fig. 1.
Figure 3:
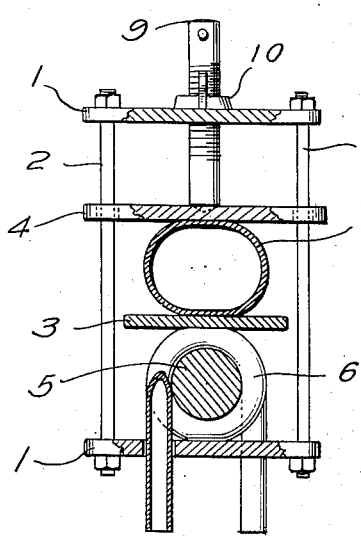
Fig. 3 is a transverse section along the line 3—3 of Fig. 1.

The uncompensated modification of the throttle valve of the present invention is shown in Figs. 1 to 3. The valve is mounted in a frame work consisting of two stationary plates 1, and guide rods 2. On these guide rods there is slidably mounted a plate 4. Plate 3 is loosely mounted in the framework so that it does not touch any of the guides and, therefore, can move without causing any binding due to friction. A rigid mandril 5 is loosely mounted between plate 3 and the bottom plate 1 of the valve frame around which is coiled a multi-turn helix of flexible plastic tubing 6 and through which the liquid which is to be controlled flows.

Between the plates 3 and 4 there is mounted a closed end tube 7 of flexible material connected at its open end through pipe 8 to a pneumatic flow controller of conventional design (not shown). The upper limit of movement of plate 4 is determined by the adjustable screw 9 which fixes the spacing between plate 4 and the upper stationary plate 1. The screw is locked in position by the locknut 10.

In operation the liquid flows through the helical coil 6 and the plate 4 is adjusted by means of the screw 9 to a position permitting maximum desired flow at a minimum air pressure setting for the pneumatic flow controller. This pressure exists in the closed end tube 7 and exerts a pressure on plate 3 determined by the position of plate 4. When the adjustment for maximum flow once has been made the locknut 10 is tightened and the pneumatic controller is then thrown into operation.

The controller is set for a desired steady flow of liquid and operates in conventional manner to increase the air pressure in the tube 7 until the plate 3 has moved a sufficient distance to constrict the turns of the helix 6 until the flow of liquid is reduced to the predetermined volume for which the controller is set. From there on the controller operates in conventional manner, an increase in flow resulting in an increase of air pressure from the controller to the tube 7 until the plate constricts the helix 6 sufficiently to reduce the flow to the predetermined figure. Correspondingly a reduction in flow results in reduced air pressure from the controller which permits the plate 3 to rise and reduce the constriction of the helix 6 until normal flow is again reached.

Figure 4:
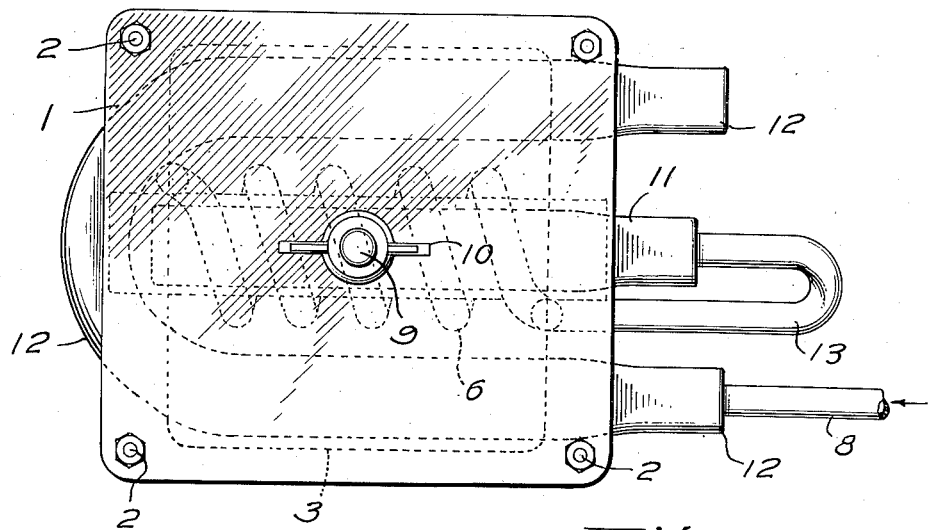
Fig. 4 is a side elevation of a pressure compensated throttle valve.
Figure 5:
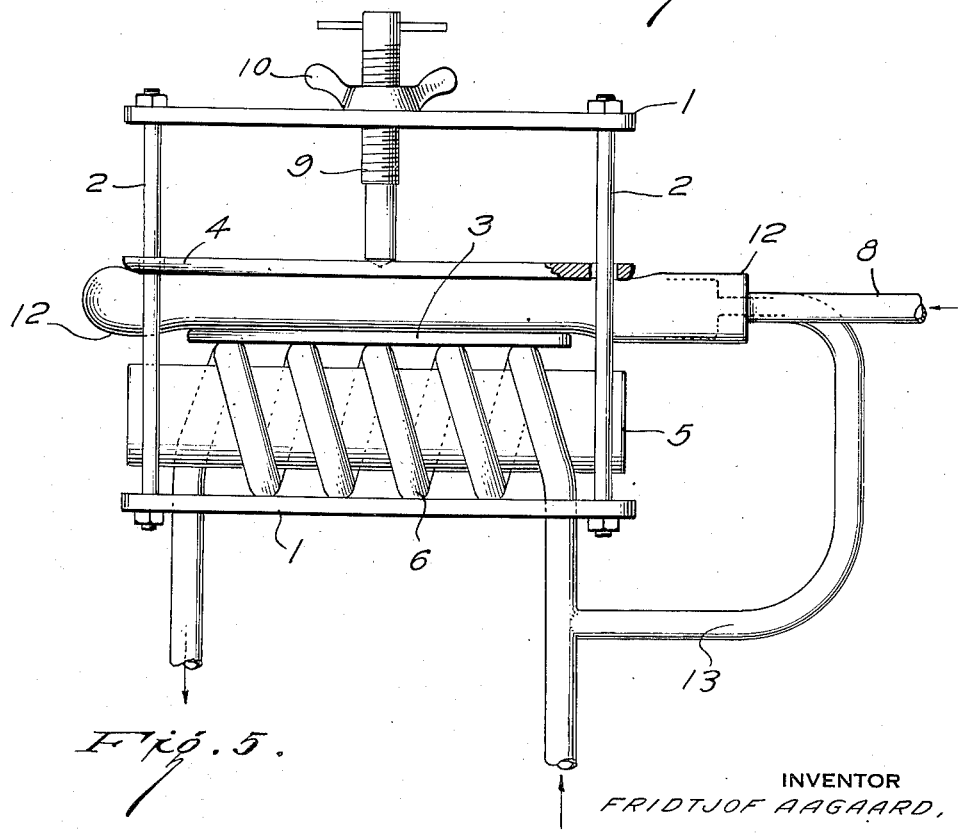
Fig. 5 is a bottom view of the throttle valve shown in Fig. 4.

The pneumatic flow controller is not shown, as any conventional pneumatic flow controller may be used and the present invention is not limited to the use of any particular controller design. Similarly the controller fluid is not limited to air or another gas. Liquids are equally useful as, of course, the flexible tube 7 responds to changes in liquid pressure in precisely the same way as it does to changes in air pressure.

Where wide fluctuations in liquid pressure are encountered a compensated throttle valve is desirable and such a valve is illustrated in Figs. 4 and 5. This valve includes the framework, stationary plates, moveable plates, adjusting screw, helix and mandril of the uncompensated modification shown in Figs. 1 to 3 and accordingly these parts bear the same reference numerals. Compensation is effected by means of a second closed end flexible tube between plates 3 and 4 which is shown as mounted in the center of a U shaped closed end flexible tube 12 connected to the pneumatic flow controller. This U tube replaces the straight tube 7 of Figs. 1 to 3. The open end of the compensating tube 11 is connected through pipe 13 to the tubing 6 at the point of liquid inlet, the direction of liquid flow through the helix being shown by arrows.

The valve is adjusted with normal liquid pressure for maximum flow exactly as described in connection with the uncompensated valve of Figs. 1 to 3. Flow is then controlled to the value set on the pneumatic flow controller by the air pressure in the flexible U tube 12. The position of the moveable plate 3 is thus determined by the sum of the forces exerted by the compensating tube 11 and controller tube 12. Any increase in fluid pressure at the inlet to the helix results in increased pressure in the expansible controller air tube 11 which will cause the plate 3 to move and will further restrict the helix 6 thus compensating, at least partially, for the increase in liquid pressure. The degree of compensation will depend, of course, on the relative sizes of the flexible tubes 11 and 12. Sufficient compensation is provided to neutralize a large portion of the effect of pressure fluctuations so that the pneumatic flow controller only operates on the small residual flow changes and those which result of changes in flow conditions beyond the throttle valve.

I claim:

1. A pneumatically controlled throttling device for fluids comprising in combination a multi-turn helix of flexible tubing on a rigid mandril, through which tubing the fluid to be throttled flows, guides at right angles to the axis of the mandril, a rigid bottom plate fastened to one end of the guides and in contact with the helix, a second plate in contact with the helix on the side opposite the bottom plate and out of contact with the guides but capable of movement at right angles to the mandril axis, a third plate spaced from the second plate and slidable longitudinally on the guides, a flexible tube closed at one end adapted to be connected to a source of varying gas pressure between the second and third plates and means for adjusting the position of the third plate on the guides, the mandril being freely moveable in a direction parallel to the guides.

2. A pressure compensating throttling device according to claim 1 in which an additional closed end flexible tube is mounted between the plates, the open end of which is connected to a source of fluid pressure proportional to the inlet pressure on the liquid.

3. A pressure compensating throttling device according to claim 1 in which an additional closed end flexible tube is mounted between the plates, the open end of which is connected to the inlet end of the multi-turn helix.

4. A throttling device for fluid flow comprising in combination a multi-turn helix of flexible tubing around a rigid mandril through which the fluid to be throttled flows, guides at right angles to the axis of the mandril, a rigid plate fastened to one end of the guides and in contact with the helix, a second plate in contact with the helix on the side opposite the rigid plate and movable at right angles to the mandril axis and means for moving said movable plate to vary the spacing between rigid plate and movable plate, whereby each turn of the helix is compressed at a plurality of points.

FRIDTJOF AAGAARD.

REFERENCES CITED

The following references are of record in the file of this patent:

UNITED STATES PATENTS

| Number | Name | Date |
|---|---|---|
| 597,443 | Thomas | Jan. 18, 1898 |
| 1,120,002 | Walquist | Dec. 8, 1914 |
| 1,284,465 | Ryan | Nov. 12, 1918 |
| 1,983,213 | Brady | Dec. 4, 1934 |
| 2,069,261 | Monnet | Feb. 2, 1937 |
| 2,422,921 | Nier | June 24, 1947 |
| 2,492,149 | Heuver | Dec. 27, 1949 |

FOREIGN PATENTS

| Number | Country | Date |
|---|---|---|
| 202,470 | Great Britain | of 1923 |